(12) United States Patent
Yefet et al.

(10) Patent No.: US 12,068,968 B2
(45) Date of Patent: Aug. 20, 2024

(54) EFFICIENT SCATTERING TO BUFFERS

(71) Applicant: MELLANOX TECHNOLOGIES, LTD., Yokneam (IL)

(72) Inventors: Gal Yefet, Haifa (IL); Saar Tarnopolsky, Haifa (IL); Avi Urman, Yokneam Illit (IL); Dotan David Levi, Kiryat Motzkin (IL); Elena Agostini, Rome (IT)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 382 days.

(21) Appl. No.: 17/588,295

(22) Filed: Jan. 30, 2022

(65) Prior Publication Data
US 2023/0291693 A1    Sep. 14, 2023

(51) Int. Cl.
*H04L 47/2441*    (2022.01)
*H04L 47/6295*    (2022.01)
*H04L 69/22*    (2022.01)

(52) U.S. Cl.
CPC .......... *H04L 47/2441* (2013.01); *H04L 69/22* (2013.01)

(58) Field of Classification Search
None
See application file for complete search history.

(56) References Cited

U.S. PATENT DOCUMENTS

| | | |
|---|---|---|
| 10,516,710 B2 | 12/2019 | Levi et al. |
| 11,190,462 B2 | 11/2021 | Levi et al. |
| 2013/0166793 A1* | 6/2013 | Shahar ............... G06F 13/28 710/26 |
| 2014/0181249 A1* | 6/2014 | Saeki ............... H04L 67/1097 709/217 |
| 2016/0261526 A1* | 9/2016 | Kodama ............... H04L 45/38 |
| 2016/0283283 A1* | 9/2016 | Jung ............... H04L 67/1004 |
| 2019/0260686 A1* | 8/2019 | Bowers ............... H04L 47/6255 |
| 2023/0283566 A1* | 9/2023 | Ren ............... H04L 47/62 370/412 |

OTHER PUBLICATIONS

"Nvidia® Mellanox® BlueField® SmartNIC for Ethernet High Performance Ethernet Network Adapter Cards", datasheet, pp. 1-3, year 2020.

* cited by examiner

*Primary Examiner* — Duc T Duong
(74) *Attorney, Agent, or Firm* — MEITAR PATENTS LTD.

(57) ABSTRACT

In one embodiments, data communication system include a communication apparatus, which is configured to receive data from different user equipment devices a schedule of time periods, and packetize the data from respective ones of the user equipment devices for respective ones of the time periods into packets, a memory including a plurality of buffers, and a network interface controller configured to receive the packets from the communication apparatus, and scatter respective portions of the data belonging to respective groups of successive ones of the time periods to the buffers, responsively to a static set of steering rules, and timing information of respective ones of the packets, and wherein each respective portion of the data is scattered to the buffers a same scatter pattern.

24 Claims, 10 Drawing Sheets

| SLOT | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| SUBFRAME | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| FRAME | 0 | | | | | | | | | | 1 | | | | | | | | | | 2 |

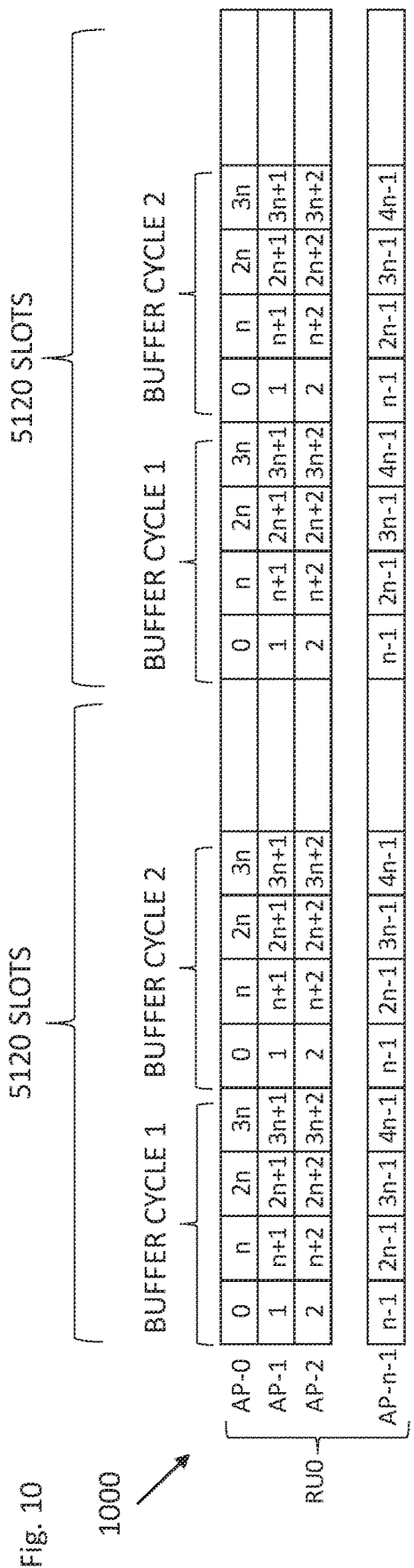

EFFICIENT SCATTERING TO BUFFERS

FIELD OF THE INVENTION

The present invention relates to computer systems, and in particular, but not exclusively to, scattering data to memory.

BACKGROUND

In communication systems, a communication apparatus may receive data from multiple user equipment (UE) devices, for example, via a wireless protocol, such a LTE, 4G, or 5G. The communication apparatus may include one or more radio units (RUS), with each RU including one or more antenna ports (APs).

The RUs may compress and packetize the data received from the UEs as Ethernet packets for forwarding to one or more nodes, for example, a host device or smart network interface controller (NIC) such as a BlueField™ SmartNIC of NVIDIA Corporation, Santa Clara, CA, USA.

In the example of 5G, antenna ports (AP) are parallel flows within a slot that are transmitted concurrently, each has a dedicated time-frequency grid. All antenna ports within a slot of an RU are processed together. All Ethernet data transferred from the RU to a processor such as a GPU is over evolved Common Public Radio Interface (eCPRI) protocol. In a receiving NIC, each High physical (PHY) pipeline consumes a single "flow" of information received over the air by one of the RUs. The "flow", which is associated with a piece of time-frequency domain, is called a section in O-RAN and is referred to by an identifier, e.g., SectionID. For each section, IQ data produced by a respective RU is optionally compressed and then packetized into Ethernet frames. A single Ethernet frame can contain data from multiple sections. IQ data is expressed in quanta called Physical Resource Blocks (PRBs). A PRB is a collection of 12 consecutive Resource Elements (REs); each RE contains one in-phase (I) and one quadrature (Q) component. Each message in eCPRI has time driver headers for frame, subframe, and slot. Each header holds the ID of the relevant field (Frame/Subframe/Slot). A Frame length in time is pre-defined, as well as Subframe time (smaller than Frame time) and Slot time (smaller than Subframe). Before each slot in time, control packets deliver information of which section is going to be sent on which PRB (frequency), Symbol (time) and SectionID in the slot to the receiving device.

SUMMARY

There is provided in accordance with an embodiment of the present disclosure, data communication system, including a communication apparatus, which is configured to receive data from different user equipment devices a schedule of time periods, and packetize the data from respective ones of the user equipment devices for respective ones of the time periods into packets, a memory including a plurality of buffers, and a network interface controller configured to receive the packets from the communication apparatus, and scatter respective portions of the data belonging to respective groups of successive ones of the time periods to the buffers, responsively to a set of steering rules, and timing information of respective ones of the packets, and wherein each respective portion of the data is scattered to the buffers a same scatter pattern.

Further in accordance with an embodiment of the present disclosure the network interface controller is configured to scatter the respective portions of the data belonging to the respective groups of the successive ones of the time periods to the buffers, responsively to the set of steering rules which is static of the time periods, and the timing information of the respective ones of the packets.

Still further in accordance with an embodiment of the present disclosure the network interface controller is configured to scatter the respective portions of the data belonging to the respective groups of successive ones of the time periods to the buffers, responsively to the static set of steering rules, and header information of respective ones of the packets.

Additionally in accordance with an embodiment of the present disclosure the network interface controller is configured to scatter the respective portions of the data belonging to the respective groups of successive ones of the time periods to the buffers, responsively to the static set of steering rules, and arrival times of respective ones of the packets.

Moreover, in accordance with an embodiment of the present disclosure the network interface controller is configured to scatter the respective portions of the data belonging to the respective groups of successive ones of the time periods to the buffers, responsively to the static set of steering rules, and arrival times and header information of respective ones of the packets.

Further in accordance with an embodiment of the present disclosure the communication apparatus is configured to wirelessly receive data from the different user equipment devices over a range of respective frequencies the schedule of time periods.

Still further in accordance with an embodiment of the present disclosure the network interface controller is configured to scatter the respective portions of the data belonging to the respective groups of the successive ones of the time periods to the buffers such that each of the buffers is contiguous in the memory, and at least some of the buffers straddle memory keys in the memory.

Additionally in accordance with an embodiment of the present disclosure the network interface controller is configured to scatter the respective portions of the data belonging to the respective groups of the successive ones of the time periods to the buffers over respective buffer cycles, responsively to the static set of steering rules applied in each one of the respective buffer cycles, and the timing information of the respective ones of the packets, and wherein in each one of the respective buffer cycles the respective portion of the data is scattered to the buffers the same scatter pattern, which is consistent over the respective buffer cycles.

Moreover, in accordance with an embodiment of the present disclosure, the system includes a processor, which is configured to read, in each one of the respective buffer cycles, the scattered respective portion of the data from the buffers for processing responsively to the same scatter pattern.

Further in accordance with an embodiment of the present disclosure, the system includes a host device including the processor and the memory.

Still further in accordance with an embodiment of the present disclosure, the system includes a chip including the processor, the memory, and the network interface controller, the processor being a data processing unit (DPU) and the memory being a DPU memory.

Additionally in accordance with an embodiment of the present disclosure the processor is a graphics processing unit (GPU), and the memory is a GPU memory.

Moreover, in accordance with an embodiment of the present disclosure, the system includes a central processing unit (CPU) and CPU memory, wherein the network interface controller is configured to scatter payload data of respective ones of the packets to the GPU memory, and header data of respective ones of the packets to the CPU memory.

Further in accordance with an embodiment of the present disclosure the network interface controller is configured to provide a respective notification to the processor when the data has been scattered to the buffers in each one of the respective buffer cycles, and the processor is configured to read, in each one of the respective buffer cycles, the scattered respective portion of the data from the buffers for processing responsively to the same scatter pattern and the respective notification.

Still further in accordance with an embodiment of the present disclosure the network interface controller is configured to scatter the respective portions of the data belonging to the respective groups of the successive ones of the time periods to the buffers over the respective buffer cycles with each respective buffer of the buffers storing time-period-specific data for one respective time period of the time periods.

Additionally in accordance with an embodiment of the present disclosure the network interface controller is configured to scatter the respective portions of the data belonging to the respective groups of the successive ones of the time periods to the buffers over the respective buffer cycles with each respective buffer of the buffers storing data of multiple symbol numbers and multiple physical resource blocks.

Moreover, in accordance with an embodiment of the present disclosure each one of the respective buffer cycles includes four of the time periods.

Further in accordance with an embodiment of the present disclosure the network interface controller is configured to scatter the respective portions of the data belonging to the respective groups of the successive ones of the time periods to the buffers over the respective buffer cycles, responsively to slot identification and subframe identification included in header information of the respective ones of the packets.

Still further in accordance with an embodiment of the present disclosure the network interface controller is configured to scatter the respective portions of the data belonging to the respective groups of the successive ones of the time periods to the buffers over the respective buffer cycles, responsively to a binary value of the slot identification and a parity of the subframe identification included in the header information of the respective ones of the packets.

Additionally in accordance with an embodiment of the present disclosure the network interface controller is configured to scatter the respective portions of the data belonging to the respective groups of the successive ones of the time periods to the buffers over the respective buffer cycles responsively to physical resource block identification included in the header information of the respective ones of the packets.

Moreover, in accordance with an embodiment of the present disclosure the communication apparatus is configured to compress at least part of the received data from the different user equipment devices and packetize the compressed data into the packets, and the network interface controller is configured to decompress the compressed data and scatter the decompressed data to the buffers.

There is also provided in accordance with another embodiment of the present disclosure, a network interface controller device, including a network interface to receive packets from a communication apparatus, and packet processing circuitry to scatter respective portions of data belonging to respective groups of successive time periods to buffers, responsively to a static set of steering rules, and timing information of respective ones of the packets, and wherein each respective portion of the data is scattered to the buffers a same scatter pattern.

There is also provided in accordance with still another embodiment of the present disclosure, a communication method, including receiving data from different user equipment devices a schedule of time periods, packetizing the data from respective ones of the user equipment devices for respective ones of the time periods into packets, receiving the packets, and scattering respective portions of the data belonging to respective groups of successive ones of the time periods to buffers, responsively to a static set of steering rules, and timing information of respective ones of the packets, and wherein each respective portion of the data is scattered to the buffers a same scatter pattern.

There is also provided in accordance with still another embodiment of the present disclosure a method, including receiving packets from a communication apparatus, and scattering respective portions of data belonging to respective groups of successive time periods to buffers, responsively to a static set of steering rules, and timing information of respective ones of the packets, and wherein each respective portion of the data is scattered to the buffers a same scatter pattern.

BRIEF DESCRIPTION OF THE DRAWINGS

The present invention will be understood from the following detailed description, taken in conjunction with the drawings in which:

FIG. 6 is a table illustrating timeslots in a 5G implementation of the system of FIG. 1;

FIGS. 10 and 11 are schematic views showing examples of buffer allocation in the steering rules in the method of FIG. 4 according to radio unit, antenna port, and slot;

DESCRIPTION OF EXAMPLE EMBODIMENTS

Overview

Figure 1:
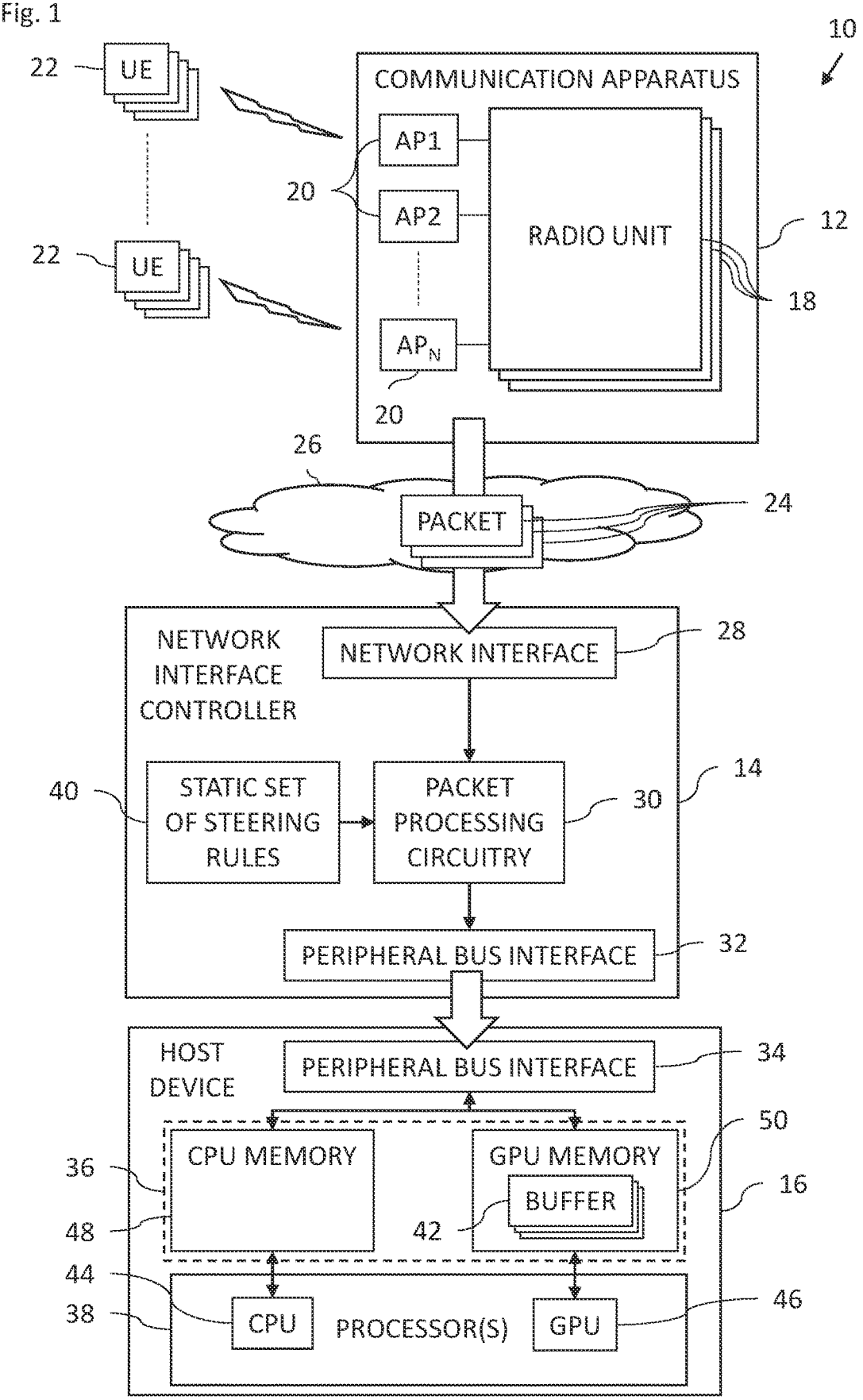
FIG. 1 is a block diagram view of computer system constructed and operative in accordance with an embodiment of the present invention.

In video streaming, there may be thousands of packets carrying a video frame. Therefore, it is important that the data from the packets is put into memory by a NIC according to pixel offset of video frames for reading by a graphics processing unit (GPU) or central processing unit (CPU) of a host device or a data processing unit (DPU) of a smart NIC. In other applications it may also be important for the data to be ordered in the memory according to a given order so that when the data is read from the memory, by the GPU, CPU or DPU, for processing, the data is already ordered according to processing requirements and does not need to be reordered.

A similar problem exists in a 5G network where data is received from different user equipment (UE) devices and is interleaved by a radio unit (RU) when the data is packetized. It may be important for the data from the different devices to be separated in memory or otherwise ordered.

As previously mentioned, in a 5G network, before each slot in time, control packets deliver information of which section is going to be sent on which PRB (frequency), Symbol (time) and SectionID in the slot to the receiving device. For example, a central processing unit (CPU) in the receiving device may send instructions (based on the control packets), before each slot in time, to a graphics processing unit (GPU) in the receiving device. The instructions may specify how the GPU should retrieve data from the memory into which the data was written. This solution entails a lot of involvement of the CPU and GPU and is not scalable.

Another solution is for a receiving NIC to store packets in a temporary GPU memory. The CPU notifies the GPU to reorder the packets. The GPU reorders the packets and then copies the data to buffers based on the control packets. Therefore, there is a lot of CPU and GPU processing.

Another solution is to offload scattering of data to the memory by the NIC in a way that GPU (or other processor) knows from where to fetch the data in the memory without using a control packet. In this solution, the CPU to creates steering rules from the control packets so that the NIC writes packet data according to the steering rules to memory so that the data in the memory is in the correct order for the GPU (or another processor) to read. Although this relieves the GPU from having to reorder the packets, the CPU needs to create steering rules per future slot (according to the control packets), and is therefore still processor intensive.

Therefore, embodiments of the present invention solve at least some of these problems by providing a static set of steering rules which are valid over multiple time slots so that the NIC can scatter data of multiple time slots using the same static set of steering rules. For example, data from one antenna port (AP) received by the NIC may be scattered to one or more memory buffers which are used over and over again during future time slots in such a way that the NIC knows to where to scatter the data, and the processor (e.g., GPU, CPU, or DPU) knows from where to fetch the data in the buffer(s).

In some embodiments, the data is scattered to the memory buffers according to buffer cycles. The data is received by the NIC one timeslot after the next. The NIC scatters the data of a number of timeslots in each buffer cycle, and once the data for one buffer cycle has been scattered to the memory buffers, the NIC informs the processor, which fetches the data from the memory buffers.

In some embodiments, each buffer cycle includes the data of a fixed number of timeslots, e.g., four timeslots. For example, in the first buffer cycle, the data of slot 0 is scattered to buffer A, the data of slot 1 is scattered to buffer B, the data of slot 2 is scattered to buffer C, and the data of slot 3 is scattered to buffer D. In the second buffer cycle, the data of slot 4 is scattered to buffer A, the data of slot 5 is scattered to buffer B, the data of slot 6 is scattered to buffer C, and the data of slot 7 is scattered to buffer D, and so on for future buffer cycles. In this manner, the same four buffers A, B, C, and D, are reused in subsequent buffer cycles. Additionally, the data within the buffers is scattered using a similar pattern over the different buffer cycles.

The data may be scattered to the buffers so that each buffer includes the data of a single timeslot for a single AP buffered in a contiguous manner. Each buffer may include the data of the respective timeslot and AP ordered according to symbol number and/or PRBs. For example, in a 5G implementation, each buffer may include the data of all the PRBs (in PRB order) of symbol 1, followed by the data of all the PRBs (in PRB order) of symbol 2, and so on.

The choice of four timeslots per buffer cycle is particularly useful in a 5G implementation in which the number of timeslots in a 5G cycle is exactly divisible by four with no remainder. A 5G cycle (not to be confused with the term "buffer cycle") includes 256 frames with 10 subframes per frame, and 2 slots per subframe. Therefore, a 5G cycle includes 5,120 slots. In this manner, the data of one AP (e.g., AP1) for four consecutive timeslots can be written to four buffers (e.g., buffer A, buffer B, buffer C, and buffer D) in a buffer cycle, with the same four buffers being reused for the data of the same AP in future buffer cycles. In each buffer cycle (including four timeslots), the buffers to which the data of respective given timeslots for that AP should be scattered may be defined using steering rules. For example, for AP1 the steering rules may be defined as follows:

| SLOT | SUBFRAME | BUFFER |
| --- | --- | --- |
| Equal 0 | Even | A |
| Equal 1 | Odd | B |
| Equal 0 | Even | C |
| Equal 1 | Odd | D |

In a similar manner, each AP of each RU may be assigned a set of four buffers in which to scatter data. For example, AP2 of RU1 may be assigned buffers W, X, Y, and Z. At any given time, the memory footprint would be 8n buffers for two RUs, each with n APs using four timeslots per buffer cycle.

Using a buffer cycle of four timeslots allows the processor enough time (e.g., about three timeslots worth of time) to fetch scattered data from the buffers while the NIC temporarily stores the data of the next time slots prior to scattering. Using a buffer cycle of more than four timeslots (e.g., eight buffer cycles) is possible but may lead to more latency and require more buffers. The choice of four timeslots is by way of example only and any suitable number of timeslots may be used per cycle, depending on the communication protocol being used, and the latency of the processor fetching the data from the buffers, among other factors.

System Description

Reference is now made to FIG. 1, which is a block diagram view of data communication system 10 constructed and operative in accordance with an embodiment of the present invention. The system 10 includes a communication apparatus 12, a network interface controller 14 and a host device 16.

In some embodiments, the communication apparatus 12 is a wireless communication apparatus as shown in FIG. 1, including one or more radio units 18 with each radio unit 18 including one or more antenna ports 20 (e.g., AP1 to APn) to receive data from multiple user equipment 22. The communication apparatus 12 optionally (block) compresses the received data and packetizes the (compressed) data into packets 24 (e.g., Ethernet packets) for sending to the network interface controller 14 via a network 26. The communication apparatus 12 is described in more detail with reference to FIG. 3.

The network interface controller 14 includes: a network interface 28 configured to receive the packets 24 from the communication apparatus 12; packet processing circuitry 30 including a physical layer (PHY) chip and a MAC layer chip (not shown); and a peripheral bus interface 32 (e.g., a Peripheral Component Interconnect Express (PCIe) interface) to share data with the host device 16. The host device 16 includes a peripheral bus interface 34 (e.g., a Peripheral Component Interconnect Express (PCIe) interface) to share data with the network interface controller 14. The host device 16 also includes a memory 36 and at least one processor 38. The memory 36 includes buffers 42. The packet processing circuitry 30 of the network interface controller 14 is configured to scatter data of the packets 24 to the buffers 42 of the memory 36 responsively to a static set of steering rules 40, described in more detail with reference to FIG. 5.

In some embodiments, the processor(s) 38 include a CPU 44 and/or a GPU 46. In some embodiments, the memory 36 includes a CPU memory 48 (used by the CPU 44) and a GPU memory 50 (used by the GPU 46) and including the buffers 42. The CPU 44 is configured to prepare the packet processing circuitry 30 of the network interface controller 14 to receive the packets 24, understand eCPRI headers, and provide the static set of steering rules 40 to the packet processing circuitry 30.

Figure 2:
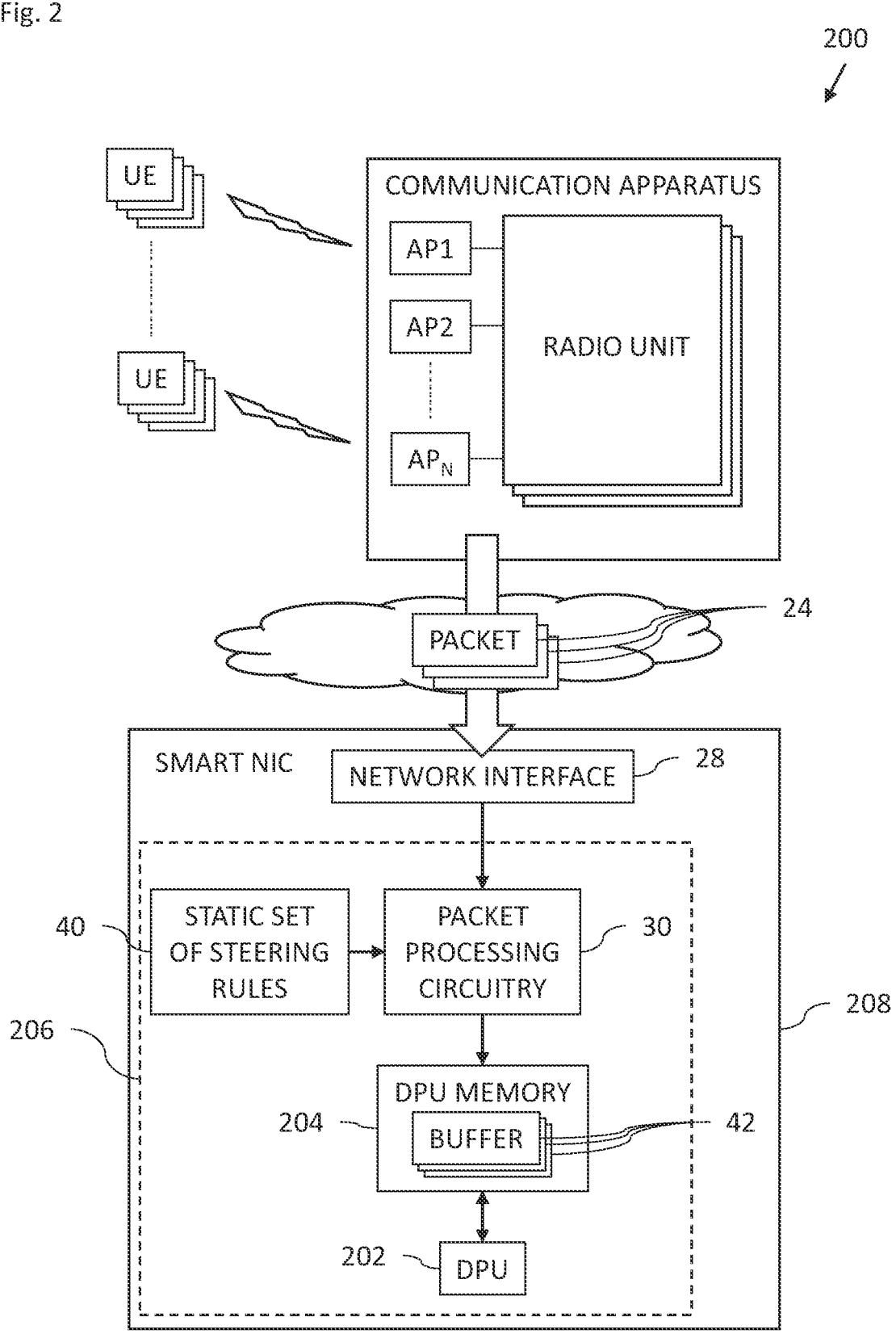
FIG. 2 is a block diagram view of a computer system constructed and operative in accordance with an alternative embodiment of the present invention.

Reference is now made to FIG. 2, which is a block diagram view of a data communication system 200 constructed and operative in accordance with an alternative embodiment of the present invention. The data communication system 200 is substantially the same as the system 10 of FIG. 1 except for the following differences. The data communication system 200 includes a smart NIC 208 (instead of the network interface controller 14), which includes the packet processing circuitry 30 and network interface 28 (of the network interface controller 14), a data processing unit (DPU) 202 and a DPU memory 204 used by the data processing unit 202. The packet processing circuitry 30 is configured to scatter data of the packets 24 to the DPU memory 204 responsively to the static set of steering rules 40. In some embodiments, the smart NIC 208 includes a chip 206 including the data processing unit 202, DPU memory 204, and the packet processing circuitry 30.

The description provided with reference to FIGS. 3-13 is made with respect to system 10 of FIG. 1 for the sake of simplicity. It should be noted that the description provided with reference to FIGS. 3-13 may be applied, mutatis mutandis, to the system 200 of FIG. 2. For example, when FIGS. 3-13 describe the packet processing circuitry 30 scattering data to the buffers 42 of the GPU memory 50 or the memory 36 for reading by the processor 38 (the CPU 44 and/or the GPU 46), the description may also be extended to the packet processing circuitry 30 scattering data to the buffers 42 of the DPU memory 204 for reading by the data processing unit 202.

Figure 3:
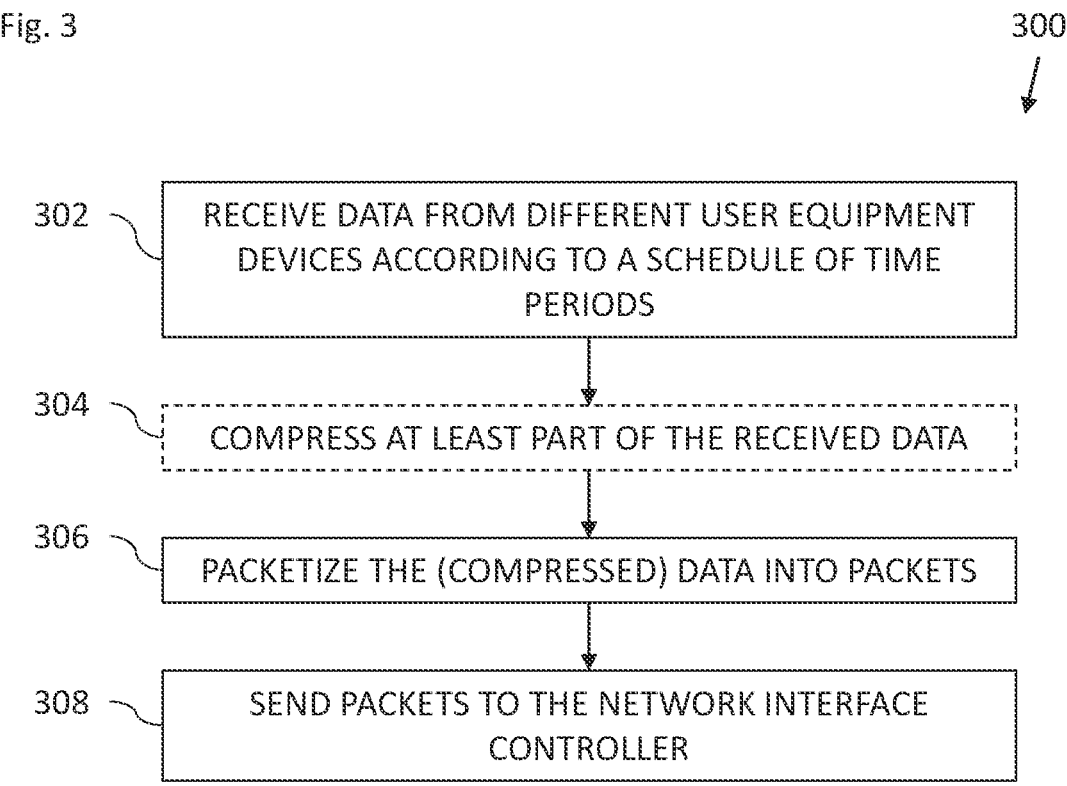
FIG. 3 is a flowchart including steps in a method performed by a communication apparatus in the system of FIG. 1.

Reference is now made to FIG. 3, which is a flowchart 300 including steps in a method performed by the communication apparatus 12 in the system 10 of FIG. 1. The radio units 18 of the communication apparatus 12 are configured to receive data from different user equipment devices 22 according to a schedule of time periods (block 302). In some embodiments, the radio units 18 of the communication apparatus 12 are configured to wirelessly receive data from the different user equipment devices 22 over a range of respective frequencies according to the schedule of time periods. In some embodiments, the radio units 18 of the communication apparatus 12 are configured to compress at least part of the received data (e.g., IQ symbols) from the different user equipment devices 22 (block 304) using a compression algorithm (e.g., block compression). The radio units 18 of the communication apparatus 12 are configured to packetize the (compressed) data from respective ones of the user equipment devices 22 for respective time periods into the packets 24 (block 306). For example, each packet may include compressed IQ symbols for a specific user equipment 22 and/or a specific timeslot. The radio units 18 are configured to send the packets 24 over the network 26 to the network interface controller 14 (and optionally to other network interface controllers 14) (block 308).

In practice, some or all of the functions of the communication apparatus 12 may be combined in a single physical component or, alternatively, implemented using multiple physical components. These physical components may comprise hard-wired or programmable devices, or a combination of the two. In some embodiments, at least some of the functions of the communication apparatus 12 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 4:
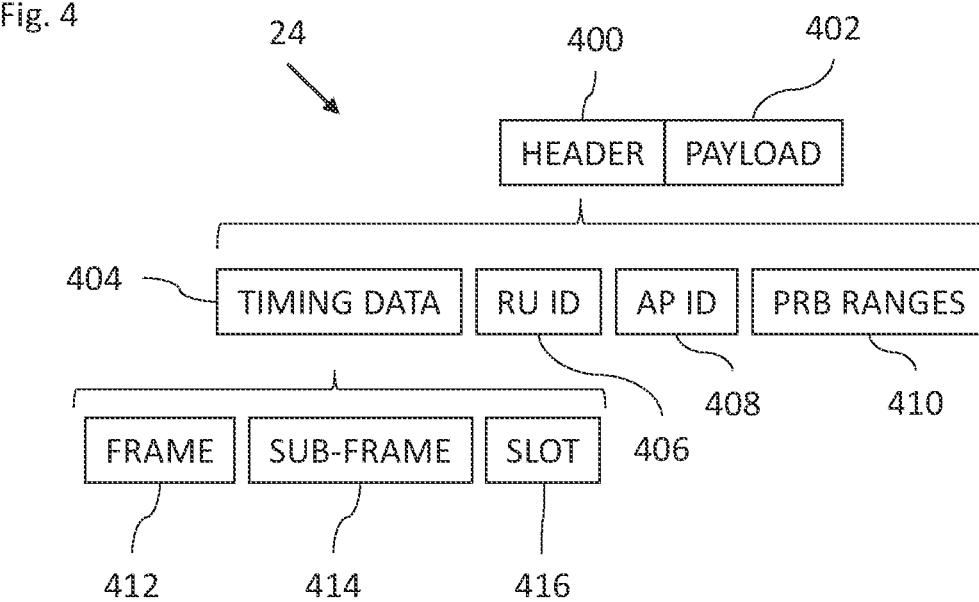
FIG. 4 is a schematic view of a packet generated in the method of FIG. 3.

Reference is now made to FIG. 4, which is a schematic view of one of the packets 24 generated in the method of FIG. 3. The packet 24 includes a header 400 and payload 402. The header 400 may include one or more sub-headers (e.g., Ethernet header, eCPRI header generic header and section header(s)). The header 400 includes timing data 404, a radio unit (RU) identification (ID) 406, and an AP ID 408, and PRB ranges 410 listing the PRB ranges of the symbols in the packet 24. The timing data 404 may include information about a frame 412, subframe 414, and slot 416 of the payload data 402 of the packet 24.

Figure 5:
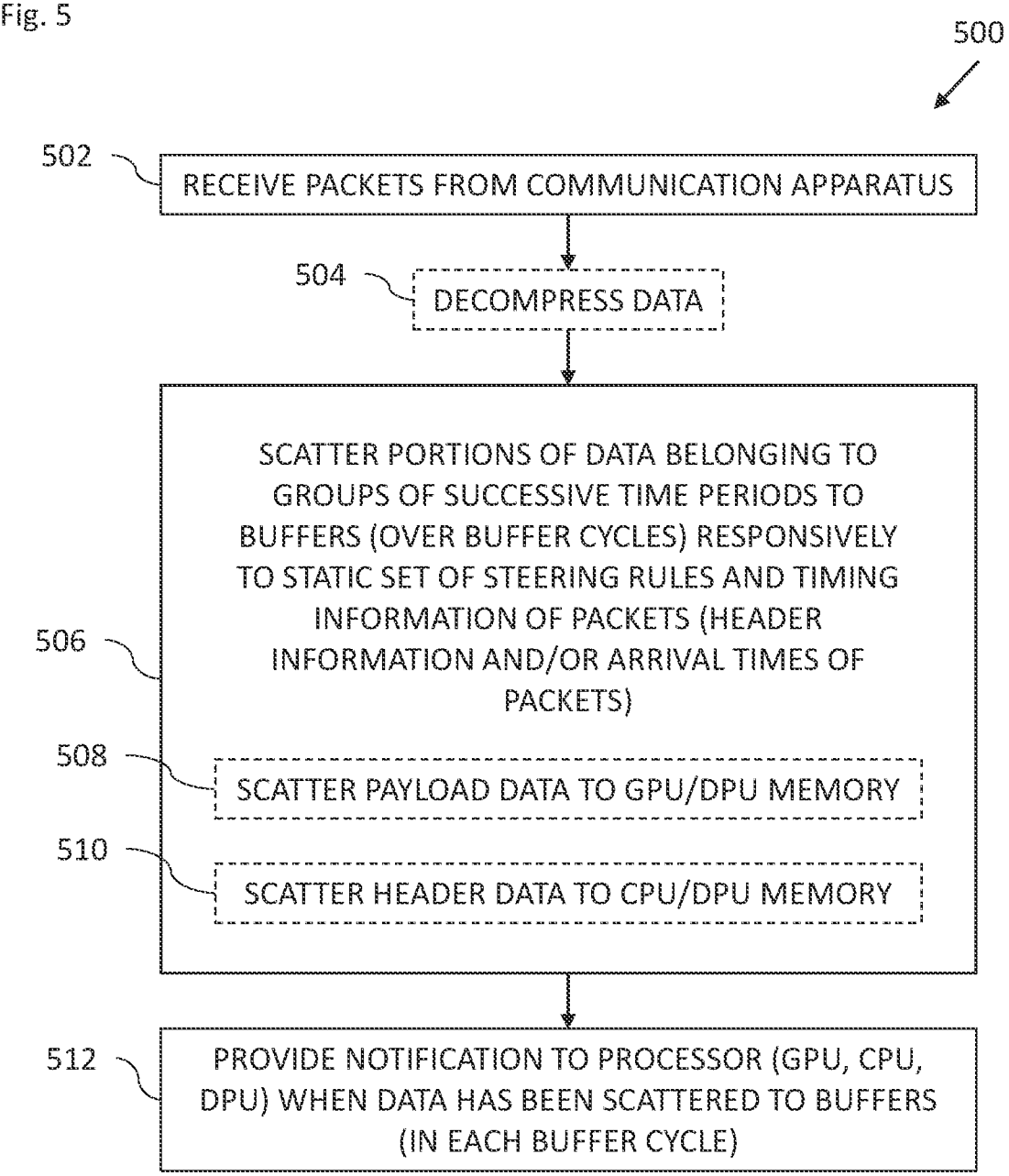
FIG. 5 is a flowchart including steps in a method performed by a network interface controller of the system of FIG. 1.

Reference is now made to FIG. 5, which is a flowchart 500 including steps in a method performed by the network interface controller 14 of the system 10 of FIG. 1. The network interface 28 of the network interface controller 14 is configured to receive the packets 24 from the communication apparatus 12 (block 502). In some embodiments, the packet processing circuitry 30 of the network interface controller 14 is configured to decompress the compressed data (of the packets 24) (block 504).

The packet processing circuitry 30 of the network interface controller 14 is configured to scatter respective portions of the (decompressed) data (of the packets 24) belonging to respective groups of successive time periods (of the schedule of time periods, e.g., group 1 includes timeslots 1-4, group 2 includes timeslots 5-9, and so on) to the buffers 42, responsively to: the static set of steering rules 40; timing information of respective ones of the packets 24 (block 506); and other data of the packets 24. The other data of the packets 24 may include data about the source of the data, such as RU ID 406, AP ID 408, and PRB ranges 410. For example, data belonging to AP1 for time periods 1, 5, 9 etc. are scattered to buffer A, while data belonging to AP1 for time periods 2, 6, 10 etc. are scattered to buffer B, and so on.

The static set of steering rules 40, the manner of scattering, and the timing information are described in more detail below with reference to FIGS. 5-12. Each respective portion of the data is scattered to the buffers 42 according to a same scatter pattern. In other words, the data is scattered to the buffers 42 in such a manner (e.g., according to the scatter pattern) so that the data may be fetched by the processor 38 over different groups of time periods by knowing the static set of steering rules 40.

In some embodiments, the timing information used to scatter the data may be derived from header information of the packets 24 and/or arrival times of the packets 24. The header information may provide timeslot information such as frame 412, subframe 414, and slot 416. The arrival times of the packets 24 in the network interface controller 14 are also indicative of the arrival times of the data in the communication apparatus 12 as the clocks of the network interface controller 14 and the communication apparatus 12 are synchronized and therefore the arrival times of the packets 24 are indicative of the timeslot information, such as frame 412, subframe 414, and slot 416, for example. The time periods may be derived from the header information and/or the arrival times of the packets 24. Therefore, in some embodiments, the packet processing circuitry 30 of the network interface controller 14 is configured to scatter respective portions of data belonging to respective groups of successive time periods to the buffers 42, responsively to: the static set of steering rules; and header information of respective ones of the packets 24 and optionally arrival times of respective ones of the packets 24.

In some embodiments, the data is scattered to the memory buffers 42 according to buffer cycles, described in more detail with reference to FIG. 8. The data is received by the network interface controller 14 one timeslot after another. The packet processing circuitry 30 of the network interface controller 14 scatters the data of a number of timeslots in each buffer cycle, and once the data for one buffer cycle have been scattered to the memory buffers 42, the packet processing circuitry 30 of the network interface controller 14 informs the processor 38, which fetches the data from the memory buffers 42.

Therefore, in some embodiments, the packet processing circuitry 30 of the network interface controller 14 is configured to scatter respective portions of data belonging to respective groups of successive time periods to the buffers 42 over the respective buffer cycles (e.g., group 1 includes timeslots 1-4 in cycle 1, group 2 includes timeslots 5-9 in cycle 2, and so on) with each respective buffer 42 storing time-period-specific data for one respective time period. The scattering may be performed responsively to: the static set of steering rules 40 applied in each buffer cycle; timing information of respective ones of the packets 24; and other data of the packets 24. The other data of the packets 24 may include data about the source of the data, such as RU ID 406, AP ID 408, and PRB ranges 410. In each buffer cycle the respective portion of the data is scattered to the buffers 42 according to the same scatter pattern, which is consistent over the buffer cycles.

The data may be scattered to the buffers 42 so that each buffer 42 includes the data of a single timeslot for a single AP buffered in a contiguous manner. Each buffer may include the data of the respective timeslot and AP ordered according to symbol number and/or PRBs. For example, in a 5G implementation, each buffer may include the data of all the PRBs (in PRB order) of symbol 1, followed by the data of all the PRBs (in PRB order) of symbol 2, and so on.

For example, in a first buffer cycle for a given AP of a given RU (e.g., AP1 of RU0), the data of slot 0 is scattered to buffer A, the data of slot 1 is scattered to buffer B, the data of slot 2 is scattered to buffer C, and the data of slot 3 is scattered to buffer D. In a second buffer cycle, the data of slot 4 is scattered to buffer A, the data of slot 5 is scattered to buffer B, the data of slot 6 is scattered to buffer C, and the data of slot 7 is scattered to buffer D, and so on for future buffer cycles. In this manner, the same four buffers A, B, C, and D, are reused in subsequent buffer cycles.

In some embodiments, the payloads 402 of the packets 24 are scattered to the GPU memory 50 for fetching by the GPU 46, while the headers 400 of the packets 24 are scattered to the CPU memory 48 for fetching by the CPU 44. In some embodiments, the payloads 402 and headers 400 are scattered to the DPU memory 204. Therefore, in some embodiments, the packet processing circuitry 30 of the network interface controller 14 is configured to scatter payload data 402 of respective ones of the packets 24 to the GPU memory 50 (or the DPU memory 204) (block 508), and header data 400 of respective ones of the packets 24 to the CPU memory 48 (or the DPU memory 204) (block 510).

The packet processing circuitry 30 of the network interface controller 14 is configured to provide a respective notification to the processor 38 (e.g., the CPU 44, GPU 46, or the data processing unit 202) when the data has been scattered to the buffers 42 in each respective buffer cycle (block 512).

The packet processing circuitry 30 of the network interface controller 14 waits before scattering data in next buffer cycle to give the processor 38 time to read data of previous buffer cycle.

In practice, some or all of the functions of the packet processing circuitry 30 may be combined in a single physical component or, alternatively, implemented using multiple physical components. These physical components may comprise hard-wired or programmable devices, or a combination of the two. In some embodiments, at least some of the functions of the packet processing circuitry 30 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Reference is now made to FIG. 6, which is a table 600 illustrating timeslots in a 5G implementation of the system 10 of FIG. 1. A 5G cycle (not to be confused with the term "buffer cycle") includes 256 frames with 10 subframes (labeled 0-9) per frame, and 2 slots per subframe (labeled 0 and 1). Therefore, a 5G cycle includes 5,120 slots. Only frames 0, 1 and part of frame 2 are shown in FIG. 6.

In some embodiments, there are four slots (or time periods) per buffer cycle. The choice of four slots per buffer cycle is particularly useful in a 5G implementation in which the number of timeslots in a 5G cycle is exactly divisible by four with no remainder. In this manner, the data of one AP (e.g., AP1) of one RU (e.g., RU0) for four consecutive timeslots can be written to four buffers (e.g., buffer A, buffer B, buffer C, and buffer D) in a buffer cycle, with the same four buffers being reused for the data of the same AP and RU in future buffer cycles.

In a similar manner, each AP of each RU may be assigned a set of four buffers in which to scatter data. For example, AP2 of RU1 may be assigned buffers W, X, Y, and Z. Therefore, at any given time, the memory footprint would be 8n buffers for two RUs, each with n APs using four timeslots per buffer cycle, described in more detail with reference to FIGS. 10 and 11.

Using a buffer cycle of four timeslots allows the processor 38 enough time (e.g., about three timeslots worth of time) to fetch scattered data from the buffers 42 while the network interface controller 14 temporarily stores the data of the next time slots prior to scattering to the buffers 42. Using a buffer cycle of more than four timeslots (e.g., eight buffer cycles) is possible but may lead to more latency and more buffers. The choice of four timeslots is by way of example only and any suitable number of timeslots may be used per cycle, depending on the communication protocol being used, and the latency of the processor 38 fetching the data from the buffers 42, among other factors.

Figure 7:
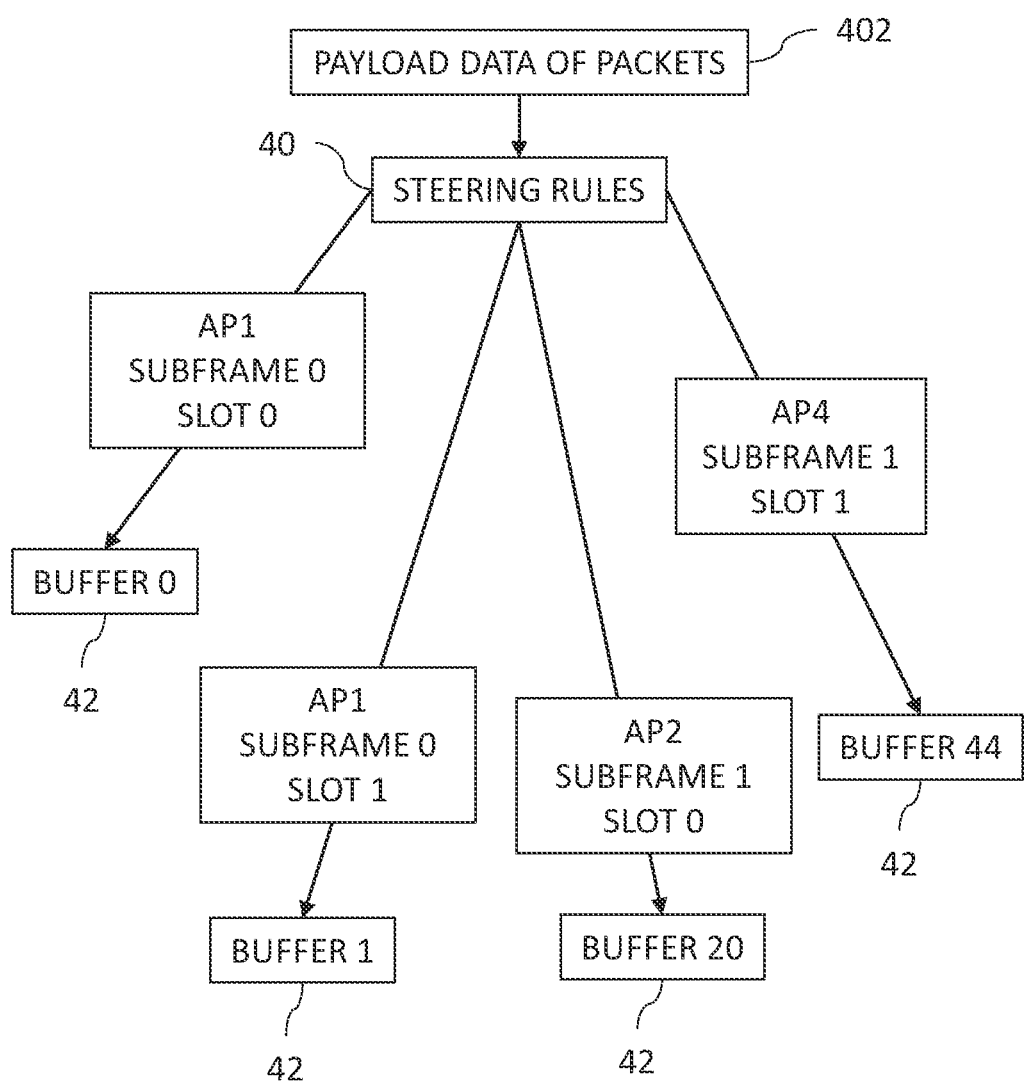
FIG. 7 is a block diagram illustrating scattering data to buffers in the method of FIG. 4.

Reference is now made to FIG. 7, which is a block diagram illustrating scattering data to buffers 42 in the method of FIG. 4. The payload data 402 may be scattered to the buffers 42 according to the static set of steering rules 40, the timeslot (which may be identified by the subframe ID and the slot ID or packet arrival time) and also according to the AP and RU of the data. For example, the data of AP1, subframe 0 and slot 0 may be scattered to buffer 0, while the data of AP1, subframe 0 and slot 1 is scattered to buffer 1. Similarly, the data of AP2, subframe 1, slot 0 may be scattered to buffer 20, while the data of AP4, subframe 1, slot 1 is scattered to buffer 44. Therefore, the network interface controller 14 is configured to scatter respective portions of the data belonging to respective groups of the successive time periods to the buffers 42 over the respective buffer cycles, responsively to slot identification and subframe identification included in header information of the respective ones of the packets 24 and/or derived from the arrival times of the packets 24. Selecting buffers based on subframe and slot ID is discussed in more detail with reference to FIG. 11.

Figure 8:
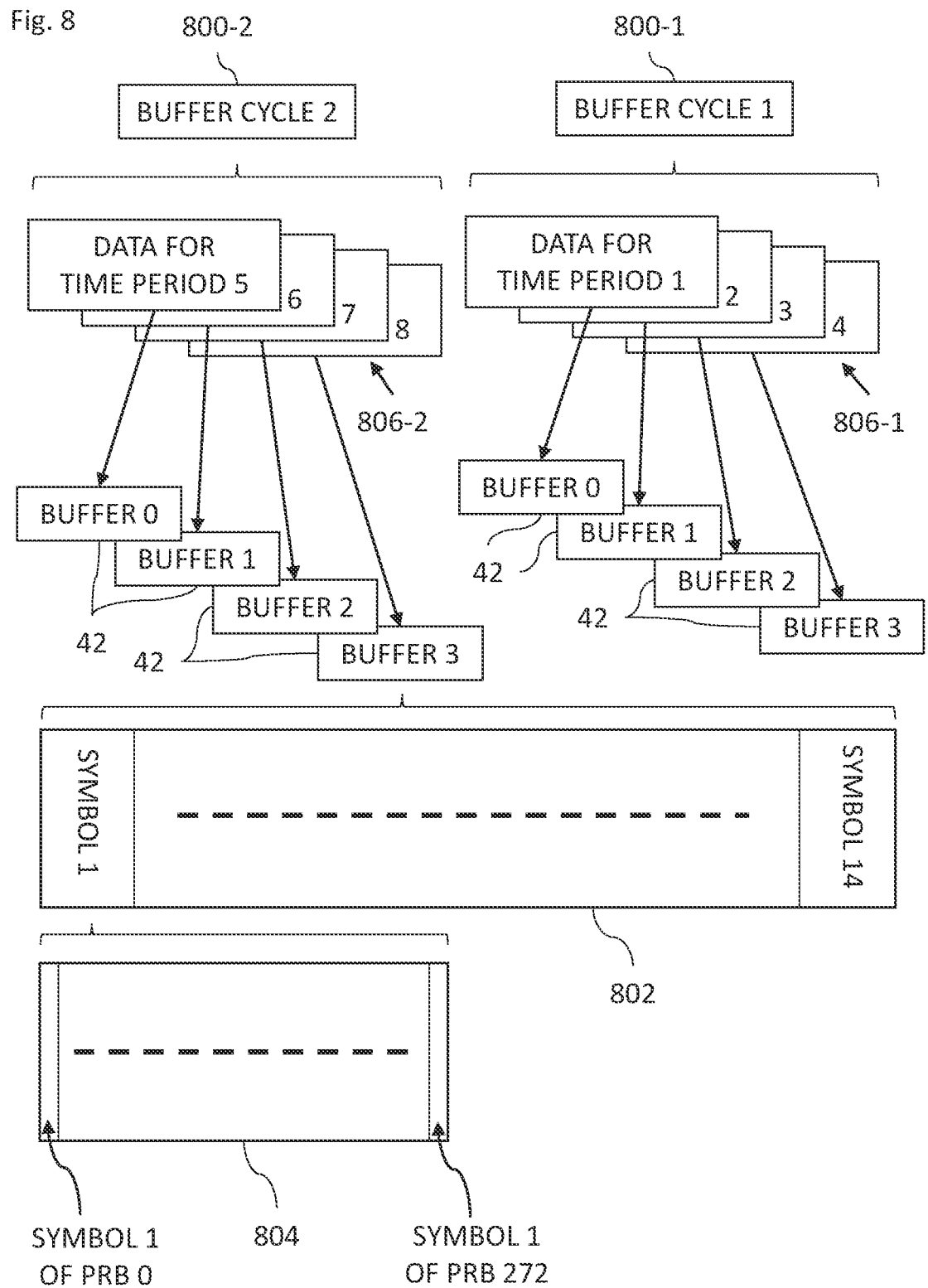
FIG. 8 is a block diagram illustrating scattering data to buffers over buffer cycles in the method of FIG. 4.

Reference is now made to FIG. 8, which is a block diagram illustrating scattering data to buffers 42 over buffer cycles 800-1, 800-2 in the method of FIG. 4.

FIG. 8 shows that for a given AP (e.g., AP1 of RU0) data 806-1 of time periods 1, 2, 3, 4, are scattered to buffers 0, 1, 2, 3, respectively, (i.e., data of time period 1 to buffer 0, data of time period 2 to buffer 1, and so on) in buffer cycle 1 (800-1). FIG. 8 also shows that for the same AP (e.g., AP1 of RU0) data 806-2 of time periods 5, 6, 7, 8, are scattered to buffers 0, 1, 2, 3, respectively, in buffer cycle 2 (800-2). Therefore, buffers 0, 1, 2, 3 are reused for the data of the same AP in substantially the same way over many buffer cycles. Therefore, the static set of steering rules 40 may be the same over the buffer cycles, and the processor 38 can fetch the data from the buffers 42 based on the same static set of steering rules 40. In some embodiments, each buffer 42 stores 14 symbols for each PRB of each slot. Block 802 shows the position of the symbols of symbol 1 and symbol 14 in buffer 3, with the symbols of symbols 2-14 being disposed in between the symbols of symbol 1 and symbol 14. In some embodiments, each buffer 42 stores all the PRBs of each symbol. Block 804 shows the position of symbol 1 of PRB 0 and symbol 1 of PRB 272 in the symbol 1 section of buffer 3 with symbol 1 of PRBs 1-271 disposed in between symbol 1 of PRB 0 and symbol 1 of PRB 272. Therefore, in FIG. 8, the data for a given AP is stored in one of the buffers 42 according to symbol number and PRB ID.

Therefore, the packet processing circuitry 30 of the network interface controller 14 is configured to scatter respective portions of the data belonging to respective groups of successive time periods to the buffers 42 over respective buffer cycles with each respective buffer 42 storing data of multiple symbol numbers and multiple physical resource blocks responsively to physical resource block identification (e.g., PRB ranges 410 of FIG. 4) included in the header information of respective packets 24 (FIG. 4).

Figure 9:
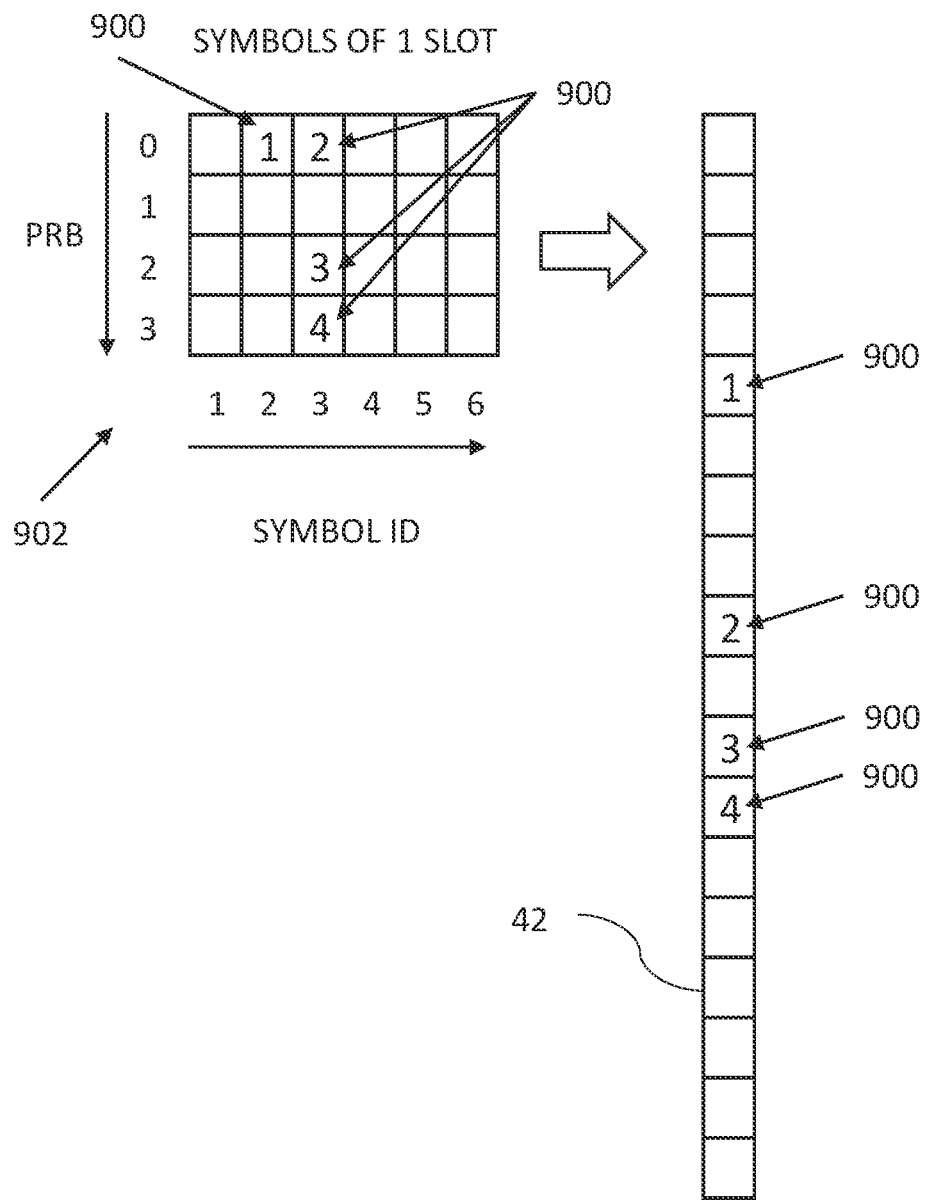
FIG. 9 is a schematic view illustrating scattering symbols to a buffer in the method of FIG. 4.

Reference is now made to FIG. 9, which is a schematic view illustrating scattering symbols 900 to one of the buffers 42 in the method of FIG. 4.

FIG. 9 shows symbols 900 in a single slot for a given AP of a given RU (e.g., AP1 of RU0) in a table 902. FIG. 9 only shows 4 PRBs in table 902 for the sake of simplicity. Of the available symbols, in the example of table 902 only some include non-zero data. For example, symbol number 2 of PRB 0 has a value "1", symbol number 3 of PRB 0 has a value "2", symbol number 3 of PRB 2 has a value "3", and symbol number 3 of PRB 3 has a value "4". The various symbol values "1", "2", "3", and "4" are scattered to the buffer 42 according to symbol number and PRB ID according to the assumption that each symbol includes 4 PRBs (in this example). Therefore, gaps exist in the buffer 42 for the symbol values with zero value (e.g., symbol 1 of PRB 0). Therefore, each PRB of each symbol number has a fixed offset in the buffer 42 which is consistent over different buffer cycles. Therefore, the packet processing circuitry 30 knows where to write each symbol of each PRB in each buffer, and the processor 38 knows from where to fetch the data of each symbol of each PRB.

Reference is now made to FIGS. 10 and 11, which are schematic views showing examples of buffer allocation in the steering rules in the method of FIG. 4 according to radio unit, antenna port, and slot.

FIG. 10 shows a table 1000 in which each AP of each RU is assigned four respective buffers which are used over and over again in each successive buffer cycle in the current 5G cycle of 5120 slots and even in the next 5G cycle of 5120 slots, and so on. For example, FIG. 10 shows that AP-2 is assigned buffers 2, n+2, 2n+2, 3n+2. There are 8n buffers assigned to all the n APs of the two RUs, which are used over and over again in each successive buffer cycle.

FIG. 11 shows a table 1100 that for a given AP of a given RU which is assigned four buffers, which for convenience will be called buffers 0, 1, 2, and 3, in the first buffer cycle, data of slot 0 of subframe 0 is scattered to buffer 0, data of slot 1 of subframe 0 is scattered to buffer 1, data of slot 0 of subframe 1 is scattered to buffer 2, and data of slot 1 of subframe 1 is scattered to buffer 3. Similarly, in the second buffer cycle, data of slot 0 of subframe 2 is scattered to buffer 0, data of slot 1 of subframe 2 is scattered to buffer 1, data of slot 0 of subframe 3 is scattered to buffer 2, and data of slot 1 of subframe 3 is scattered to buffer 3. Therefore, in each buffer cycle (including four timeslots), the four corresponding buffers (e.g., buffers 0, 1, 2, 3) to which the data of respective given timeslots for a given AP should be scattered may be defined using steering rules follows:

| SLOT | SUBFRAME | BUFFER |
| --- | --- | --- |
| Equal 0 | Even | 0 |
| Equal 1 | Odd | 1 |
| Equal 0 | Even | 2 |
| Equal 1 | Odd | 3 |

Based on the assignment of buffers shown in table 1000 of FIG. 10, for AP-0 of RU0, the steering rules may be defined as follows:

| SLOT | SUBFRAME | BUFFER |
| --- | --- | --- |
| Equal 0 | Even | 0 |
| Equal 1 | Odd | n |
| Equal 0 | Even | 2n |
| Equal 1 | Odd | 3n |

Therefore, the buffer 42 into which data should be scattered may be found based on the AP ID, the RU ID, and the binary value of the slot (whether 0 or 1) and the parity value of the subframe value (whether odd or even).

In the above manner, each AP of each RU may be assigned a set of four buffers in which to scatter data. At any given time, the memory footprint would be 8n buffers for two RUs, each with n APs using four timeslots per buffer cycle. The steering rules use header information, and optionally arrival time data, to determine to which one of buffers 0 to 8n−1 to scatter data.

Therefore, in some embodiments, the network interface controller 14 is configured to scatter respective portions of data belonging to respective groups of successive time periods to the buffers 42 over respective buffer cycles, responsively to a binary value of the slot identification and a parity of the subframe identification included in the header information of the packets 24.

Figure 12:
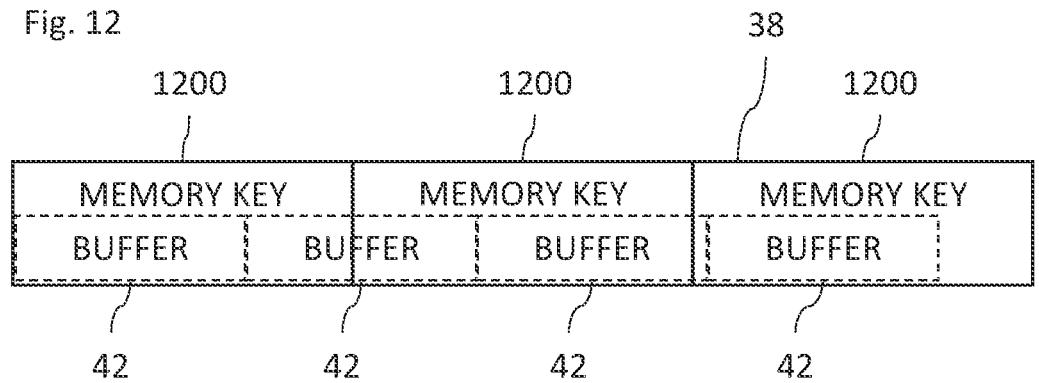
FIG. 12 is a schematic view of a memory divided into memory keys optionally used in the method of FIG. 4.

Reference is now made to FIG. 12, which is a schematic view of the memory 36 divided into memory keys 1200 optionally used in the method of FIG. 4. In some embodiments, each buffer 42 may not be the same size as a memory key 1200. Therefore, if each buffer 42 is assigned its own memory key 1200, some of the memory 36 may be wasted. However, in some embodiment, the buffers 42 are used by the same application on the processor 38, therefore the buffers 42 may have common memory keys 1200 so that two or more buffers 42 may share a single memory key 1200 and/or some buffers 42 may straddle memory keys 1200 as shown in FIG. 12 so as to reduce wasted memory. Therefore, in some embodiments, the network interface controller 14 is configured to scatter respective portions of the data belonging to the respective groups of successive time periods to the buffers 42 such that each of the buffers 42 is contiguous in the memory 36, and at least some of the buffers 42 straddle memory keys 1200 in the memory 36.

Figure 13:
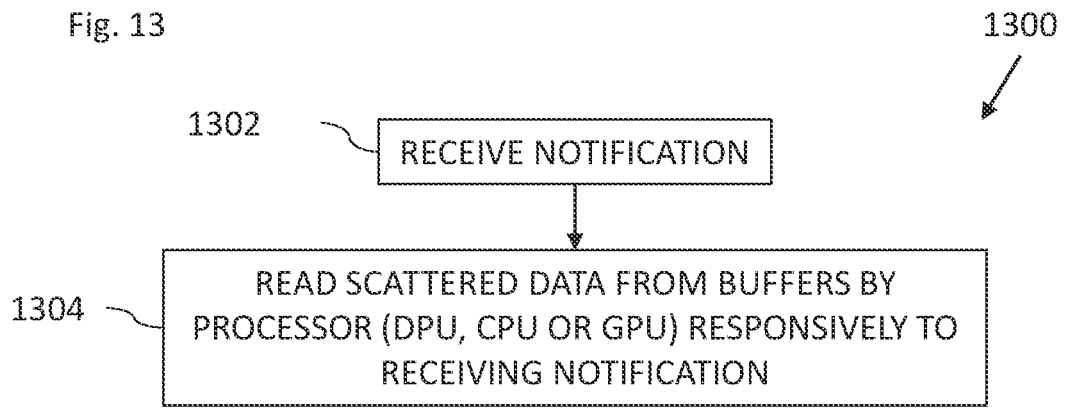
FIG. 13 is a flowchart including steps in a method performed by a processor in the system of FIG. 1.

Reference is now made to FIG. 13, which is a flowchart 1300 including steps in a method performed by the processor 38 (e.g., the CPU 44 or the GPU 46) or by the data processing unit 202 in the system 10 of FIG. 1. The processor 38 is configured to receive a notification from the network interface controller 14 when the data of each buffer cycle has been scattered to the buffers 42 (block 1302). The processor 38 is configured to read, in each buffer cycle, the scattered respective portion of the data from the buffers 42 for processing responsively to the same scatter pattern (used to scatter the data) and the respective notification (block 1304).

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. Data communication system, comprising:
a communication apparatus, which is configured to:
receive data from different user equipment devices according to a schedule of time periods; and
packetize the data from respective ones of the user equipment devices for respective ones of the time periods into packets;
a memory including a plurality of buffers; and
a network interface controller configured to:
receive the packets from the communication apparatus; and
scatter respective portions of the data belonging to respective groups of successive ones of the time periods to the buffers, responsively to: a set of steering rules; and timing information of respective ones of the packets, and wherein each respective portion of the data is scattered to the buffers according to a same scatter pattern.

2. The system according to claim 1, wherein the network interface controller is configured to scatter the respective portions of the data belonging to the respective groups of the successive ones of the time periods to the buffers, responsively to: the set of steering rules which is static of the time periods; and the timing information of the respective ones of the packets.

3. The system according to claim 1, wherein the network interface controller is configured to scatter the respective portions of the data belonging to the respective groups of successive ones of the time periods to the buffers, responsively to: the static set of steering rules; and header information of respective ones of the packets.

4. The system according to claim 1, wherein the network interface controller is configured to scatter the respective portions of the data belonging to the respective groups of successive ones of the time periods to the buffers, responsively to: the static set of steering rules; and arrival times of respective ones of the packets.

5. The system according to claim 1, wherein the network interface controller is configured to scatter the respective portions of the data belonging to the respective groups of successive ones of the time periods to the buffers, responsively to: the static set of steering rules; and arrival times and header information of respective ones of the packets.

6. The system according to claim 1, wherein the communication apparatus is configured to wirelessly receive data from the different user equipment devices over a range of respective frequencies according to the schedule of time periods.

7. The system according to claim 1, wherein the network interface controller is configured to scatter the respective portions of the data belonging to the respective groups of the successive ones of the time periods to the buffers such that each of the buffers is contiguous in the memory, and at least some of the buffers straddle memory keys in the memory.

8. The system according to claim 1, wherein the network interface controller is configured to scatter the respective portions of the data belonging to the respective groups of the successive ones of the time periods to the buffers over respective buffer cycles, responsively to: the static set of steering rules applied in each one of the respective buffer cycles; and the timing information of the respective ones of the packets, and wherein in each one of the respective buffer cycles the respective portion of the data is scattered to the buffers according to the same scatter pattern, which is consistent over the respective buffer cycles.

9. The system according to claim 8, further comprising a processor, which is configured to read, in each one of the respective buffer cycles, the scattered respective portion of the data from the buffers for processing responsively to the same scatter pattern.

10. The system according to claim 9, further comprising a host device comprising the processor and the memory.

11. The system according to claim 9, further comprising a chip including the processor, the memory, and the network interface controller, the processor being a data processing unit (DPU) and the memory being a DPU memory.

12. The system according to claim 9, wherein the processor is a graphics processing unit (GPU), and the memory is a GPU memory.

13. The system according to claim 12, further comprising a central processing unit (CPU) and CPU memory, wherein the network interface controller is configured to scatter payload data of respective ones of the packets to the GPU memory, and header data of respective ones of the packets to the CPU memory.

14. The system according to claim 9, wherein:
the network interface controller is configured to provide a respective notification to the processor when the data has been scattered to the buffers in each one of the respective buffer cycles; and
the processor is configured to read, in each one of the respective buffer cycles, the scattered respective portion of the data from the buffers for processing responsively to the same scatter pattern and the respective notification.

15. The system according to claim 9, wherein the network interface controller is configured to scatter the respective portions of the data belonging to the respective groups of the successive ones of the time periods to the buffers over the respective buffer cycles with each respective buffer of the buffers storing time-period-specific data for one respective time period of the time periods.

16. The system according to claim 15, wherein the network interface controller is configured to scatter the respective portions of the data belonging to the respective groups of the successive ones of the time periods to the buffers over the respective buffer cycles with each respective buffer of the buffers storing data of multiple symbol numbers and multiple physical resource blocks.

17. The system according to claim 15, wherein each one of the respective buffer cycles includes four of the time periods.

18. The system according to claim 17, wherein the network interface controller is configured to scatter the respective portions of the data belonging to the respective groups of the successive ones of the time periods to the buffers over the respective buffer cycles, responsively to slot identification and subframe identification included in header information of the respective ones of the packets.

19. The system according to claim 18, wherein the network interface controller is configured to scatter the respective portions of the data belonging to the respective groups of the successive ones of the time periods to the buffers over the respective buffer cycles, responsively to a binary value of the slot identification and a parity of the subframe identification included in the header information of the respective ones of the packets.

20. The system according to claim 18, wherein the network interface controller is configured to scatter the respective portions of the data belonging to the respective groups of the successive ones of the time periods to the buffers over the respective buffer cycles responsively to physical resource block identification included in the header information of the respective ones of the packets.

21. The system according to claim 1, wherein:
the communication apparatus is configured to compress at least part of the received data from the different user equipment devices and packetize the compressed data into the packets; and
the network interface controller is configured to decompress the compressed data and scatter the decompressed data to the buffers.

22. A network interface controller device, comprising:
a network interface to receive packets from a communication apparatus; and
packet processing circuitry to scatter respective portions of data belonging to respective groups of successive time periods to buffers, responsively to: a static set of steering rules; and timing information of respective ones of the packets, and wherein each respective portion of the data is scattered to the buffers according to a same scatter pattern.

23. A communication method, comprising:
receiving data from different user equipment devices according to a schedule of time periods;
packetizing the data from respective ones of the user equipment devices for respective ones of the time periods into packets;
receiving the packets; and
scattering respective portions of the data belonging to respective groups of successive ones of the time periods to buffers, responsively to: a static set of steering rules; and timing information of respective ones of the packets, and wherein each respective portion of the data is scattered to the buffers according to a same scatter pattern.

24. A method, comprising:
receiving packets from a communication apparatus; and
scattering respective portions of data belonging to respective groups of successive time periods to buffers, responsively to: a static set of steering rules;
and timing information of respective ones of the packets, and wherein each respective portion of the data is scattered to the buffers according to a same scatter pattern.

* * * * *